June 13, 1950  G. S. VAN VOORHIS  2,511,655
RUBBER THREAD PACKAGE

Filed April 30, 1948  2 Sheets-Sheet 1

Inventor:
George S. Van Voorhis,
by: J. H. McCready
Attorney.

June 13, 1950     G. S. VAN VOORHIS     2,511,655
RUBBER THREAD PACKAGE

Filed April 30, 1948                                                        2 Sheets-Sheet 2

Inventor:
George S. Van Voorhis,
by: J. H. McCready,
        Attorney.

Patented June 13, 1950

2,511,655

UNITED STATES PATENT OFFICE 2,511,655

RUBBER THREAD PACKAGE

George S. Van Voorhis, Easthampton, Mass.

Application April 30, 1948, Serial No. 24,213

2 Claims. (Cl. 206—59)

This invention relates to rubber thread and to the manufacture of that product.

The present application is a continuation-in-part of my copending application Ser. No. 621,708, filed October 11, 1945, which has matured into Patent No. 2,479,527, dated August 16, 1949. In that application a novel method of producing rubber thread and unique apparatus for practicing that method have been disclosed.

According to the common prior art methods of producing rubber thread, considerable labor and expense is involved in packaging the thread or, in other words, in getting it into suitable form for use in subsequent operations, such as weaving, knitting, thread-covering, or the like. The present invention aims to devise a rubber thread package which may be produced by the method disclosed in the application above designated, or in another way, which will be disclosed in the present application, said package being suitable for transfer directly to a fabricating machine, such as those above mentioned, and of such a nature as to avoid most of the manual labor required in the prior art production of rubber thread.

The nature of the invention will be readily understood from the following description when read in connection with the accompanying drawings, and the novel features will be particularly pointed out in the appended claims.

According to the method of making rubber thread disclosed in the application above designated, rubber in a continuous form is deposited in the spiral groove of a mold or die. Preferably this is accomplished by making a flat mold plate in which a spiral groove is formed, much like that in a phonograph disk, the groove being of the cross-sectional form and dimensions desired for the rubber thread. Next a sheet of unvulcanized rubber is placed on the grooved surface of the mold, the sheet being calendered to the thickness of the rubber thread to be made, although in some cases allowance should be made for the slight flow that will take place in molding. On the sheet of rubber so disposed a smooth surfaced pressure plate is positioned, and then this entire assembly is subjected to heat and pressure in a vulcanizing press. As the rubber softens under the heat of vulcanization, it is forced down into the spiral groove of the mold, and when vulcanization is completed, the mold is removed from the press, the plate is taken off, and the rubber then may be stripped from the groove in one long continuous thread. Because the unvulcanized sheet was gauged to the thickness of the thread to be made, it fills the mold without any substantial overflow, and consequently there is little or no waste.

Figure 2:
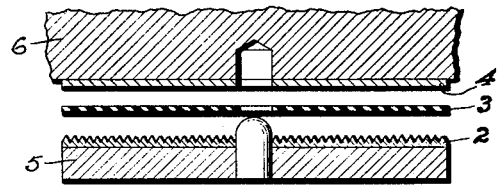
Fig. 2 is a vertical, sectional view of an apparatus provided by said invention for use in manufacturing rubber thread in accordance with this invention.
Figure 1:
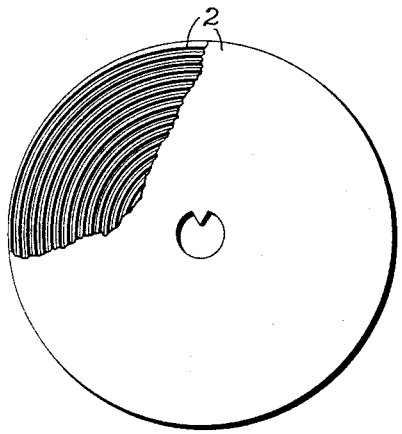
Fig. 1 is a plan view of a mold or die plate constructed in accordance with this invention, the drawings showing, in detail, a portion only of the grooved face of the plate.

Referring to Figs. 1 and 2, the mold plate above referred to is shown at 2, only a portion of the surface of the plate in Fig. 1 being shown as grooved; the calendered rubber sheet is indicated at 3; and the smooth surfaced pressure plate at 4. The bed plate of the press is indicated at 5, and the press head or platen at 6.

Figure 3:
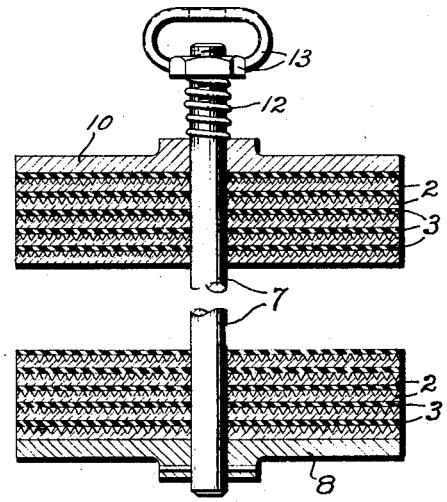
Fig. 3 is a vertical, sectional view illustrating a series of mold plates arranged in a stack for vulcanization of the threads held in them.

For mass production purposes a series of these disks can be filled with rubber in the manner above described, and they can then be stacked together, as shown in Fig. 3, to vulcanize the threads in the entire stack substantially simultaneously. The apparatus shown in Fig. 3 comprises a central shaft or rod 7 having a stiff, rigid head 8 pinned to its lower end. Mold disks 2 are assembled on this rod, alternating with rubber disks 3, until the desired number have been associated in this manner. Then a rigid top disk or head 10 is slipped on to the shaft and is backed up by a heavy spring 12 and a nut 13 which is threaded on to the upper end portion of the shaft. By tightening up the nut 13, sufficient pressure may be applied to the entire assembly for the purposes of this invention. Next, the whole assembly can be lowered into a vulcanizing kettle, and as the rubber softens during the process of vulcanization, it is forced into the spiral grooves in the mold plates, the spring 12 continuing to apply sufficient pressure to force the smooth lower surface on each mold plate into contact with the edge of the tapered spiral rib separating adjacent convolutions of the groove in the next lower plate. When vulcanization has been completed, the parts may be disassembled and the thread may be utilized in any desired manner.

Figure 4:
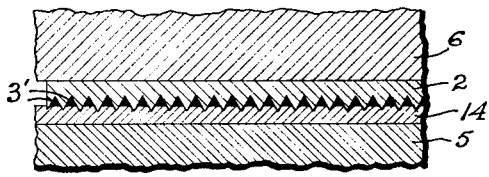
Fig. 4 is a vertical, sectional view illustrating a modification of the method above described for producing rubber thread.

A variation in the foregoing methods which is very useful in providing added flexibility in the use of a given piece of molding equipment, is illustrated in Fig. 4. Here the mold plate 2 is shown after the unvulcanized rubber 3' has been forced into the grooves of the mold by its contact with a rather thick pad 14 of yielding material, such as vulcanized rubber, either natural or synthetic, the necessary pressure being applied by the upper and lower members 6 and 5 of the press. The steps performed are the same as those above described, but as the rubber is softened during vulcanization, the pad 14 forces the rubber into the bottom of the groove in the mold plate and maintains the thread under pressure throughout the vulcanizing step. Bearing in mind the fact that the thickness of the rubber thread is controlled primarily by the gauge of the unvulcanized rubber sheet which is initially inserted between the mold plate 2 and the pad 14, it will be seen that in this arrangement threads of larger or smaller size can be made in the same mold. In other words, any size of thread may be molded in this apparatus up to that permitted by the maximum depth of the groove in the mold 2. One advantage of using the yielding pad 14 is that it cooperates with the edge of the rib separating adjacent convolutions of the spiral groove to prevent the formation of any web or "flash" bridging the rib. It may be used solely for this purpose when desired.

Figure 5:
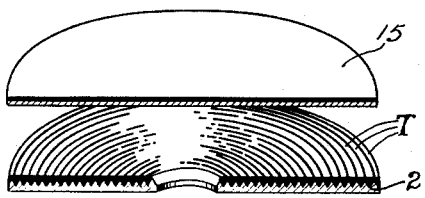
Fig. 5 is a perspective view, partly in section, illustrating a further step in the production of a thread package embodying this invention.
Figure 6:
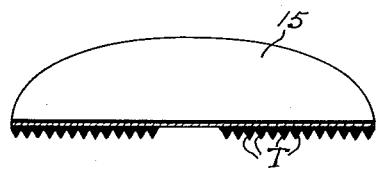
Fig. 6 is a similar view showing the complete thread package.

While the rubber thread may be removed from the mold 2 in various ways, an especially convenient method which not only removes the thread but also presents it in a novel package desirable for several reasons, is illustrated in Figs. 5 and 6. A circular disk 15 of paper, fiber, cardboard, or of any suitable material, is coated on one surface with an adhesive, and its tacky surface is then pressed against the flat exposed surface of the rubber thread T while it is still held in the mold plate 2 after the vulcanizing operation has been completed. When the adhesive has dried and thus secured the thread to the disk 15, the latter is lifted off the mold, whereupon it takes the rubber thread with it.

This thread package can be produced in accordance with the method above described at only a trifling increase in expense, and it presents the thread in a form highly convenient for almost any of the operations in which it later will be used. The disk 15 is preferably made of circular form and the thread is adhesively but releasably bonded to the face of the disk and is disposed in the form of a flat spiral. Adjacent turns or convolutions of this spiral are substantially in contact with each other if made in the manner shown in Fig. 2 and, if made as shown in Fig. 4, then they will be spaced very slightly apart, depending upon the degree to which the rubber is forced into the bottoms of adjacent turns of the spiral groove.

The package is sufficiently firm to be convenient for handling, and when a number of "ends" or strands of rubber are to be fed simultaneously to the fabricating instrumentalities of some machine as, for example, in weaving, or in covering the rubber thread, a suitable number of these packages may be supported on an arbor and the threads drawn from them and fed simultaneously into the machine. These methods of utilizing the thread are explained more fully in my copending application above referred to.

Figure 7:
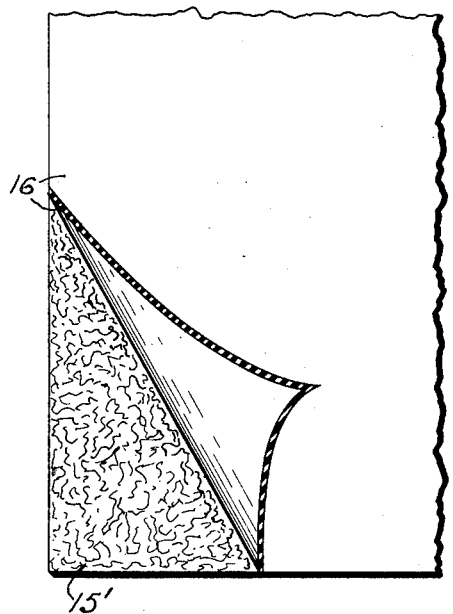
Fig. 7 is a perspective view illustrating one step in the production of a thread package like that shown in Fig. 6 but by a somewhat different method.
Figure 8:
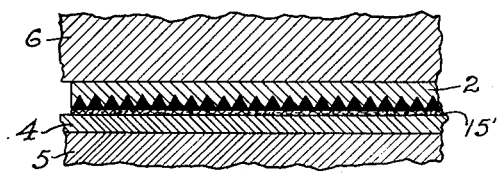
Fig. 8 is a view similar to Fig. 4 illustrating a further step in this second method.

A somewhat different method of producing this package is illustrated in Figs. 7 and 8. Here the sheet of unvulcanized rubber, calendered to the thickness desired for the thread, is initially bonded adhesively to the backing sheet 15', the rubber sheet being indicated at 16. A circular disk of suitable dimensions to fit the mold 2 is cut out of this composite sheet and is assembled with the mold with the rubber surface 16 in contact with the grooved face of the mold. This assembly is then put into a vulcanizing press in the manner shown in Fig. 8, the pressure plate or face plate 4 being opposite to the grooved face of the mold where it backs up the sheet 15' and forces the rubber coating on said sheet into the grooves when the press is closed. Thus the thread is molded and vulcanized in the manner above described, excepting only that it is initially bonded to the backing sheet of paper, or equivalent material. Thus, when the press is opened, the mold is removed, and the parts have cooled, the backing sheet 15' can be removed, carrying the rubber thread with it, this package being exactly like that shown in Fig. 6.

While I have herein shown and described a preferred embodiment of my invention, it is contemplated that minor variations may be made within the spirit and scope of the invention.

Having thus described my invention, what I desire to claim as new is:

1. A package of rubber thread comprising a backing of paper-like material having a smooth flat surface, a single continuous stretchable rubber thread of uniform cross section spirally, adhesively and removably secured to the said flat surface, the spirals of said thread being uniformly spaced throughout.

2. A package of rubber thread comprising a disk of paper having a smooth flat surface, a single continuous stretchable rubber thread of uniform cross section spirally, adhesively and removably secured to the flat surface of said disk, said thread having a flat portion where it is secured to said disk, the spirals of said thread being uniformly spaced throughout.

GEORGE S. VAN VOORHIS.

REFERENCES CITED

The following references are of record in the file of this patent:

UNITED STATES PATENTS

| Number | Name | Date |
|---|---|---|
| 2,083,398 | Rohland | June 8, 1937 |
| 2,339,475 | Hartsell et al. | Jan. 18, 1944 |
| 2,454,821 | McKee | Nov. 30, 1948 |